US012253818B2

(12) United States Patent
Sasaki et al.

(10) Patent No.: US 12,253,818 B2
(45) Date of Patent: Mar. 18, 2025

(54) IMAGE FORMING APPARATUS

(71) Applicant: CANON KABUSHIKI KAISHA, Tokyo (JP)

(72) Inventors: Hiroki Sasaki, Shizuoka (JP); Yoshiteru Kaida, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 198 days.

(21) Appl. No.: 18/064,985

(22) Filed: Dec. 13, 2022

(65) Prior Publication Data

US 2023/0195019 A1 Jun. 22, 2023

(30) Foreign Application Priority Data

Dec. 16, 2021 (JP) ................................ 2021-204612

(51) Int. Cl.

*B65H 1/14* (2006.01)
*B65H 1/24* (2006.01)
*B65H 1/26* (2006.01)
*G03G 15/00* (2006.01)

(52) U.S. Cl.

CPC ............... *G03G 15/55* (2013.01); *B65H 1/14* (2013.01); *B65H 1/24* (2013.01); *B65H 1/266* (2013.01); *B65H 2551/21* (2013.01); *B65H 2553/51* (2013.01); *B65H 2801/03* (2013.01)

(58) Field of Classification Search

CPC ...... G03G 15/55; G03G 15/6511; B65H 1/04; B65H 1/14; B65H 1/24; B65H 1/266; B65H 7/14; B65H 2551/21; B65H 2801/03; B65H 2801/06; B65H 2511/20; B65H 2511/51; B65H 2511/515; B65H 2511/52; B65H 2405/11151; B65H 2405/1122; B65H 2553/51

USPC .................................... 271/162, 271, 265.01

See application file for complete search history.

(56) References Cited

U.S. PATENT DOCUMENTS 6,307,621 B1 * 10/2001 Endo ........................ B65H 3/56 347/105
7,591,459 B2 * 9/2009 Matsumoto .............. B65H 3/48 271/97
11,203,496 B2 12/2021 Tsuda et al.

FOREIGN PATENT DOCUMENTS

JP 2005041586 A * 2/2005
JP 2008-110861 A 5/2008
JP 2016210559 A * 12/2016

* cited by examiner

*Primary Examiner* — Leslie A Nicholson, III
(74) *Attorney, Agent, or Firm* — Venable LLP

(57) ABSTRACT

An image forming apparatus includes a stacking portion including a lifting portion, a feeding member feeding a sheet stacked on the lifting portion to a conveyance passage, a position detector detecting movement of the sheet stacked on to a feedable position to the conveyance passage, a driver including a motor and performing the lifting operation of the lifting portion, a rotation detector detecting rotation of the motor, and a controller. The controller determines a factor that the position detector does not detect the movement of the sheet stacked on the lifting portion to the feedable position within a predetermined time based on a detection result of the rotation detector while controlling the driver to lift up the lifting portion.

11 Claims, 8 Drawing Sheets

(a)

(b)

IMAGE FORMING APPARATUS

FIELD OF THE INVENTION AND RELATED ART

The present invention relates to an image forming apparatus such as a printer or a copier.

Conventionally, image forming apparatuses such as printers and copiers are generally provided with a sheet stacking tray which is configured to be liftable and to store sheets. Sheet stacking trays used by image forming apparatuses can store up to a fixed number of multiple standard sheet sizes. Further, image forming apparatuses are provided with a sheet surface sensor which detects when the sheet stored in the sheet stacking tray is lifted up to a feedable position. When the sheet is stored in the sheet stacking tray, before starting the sheet feeding operation, the sheet stacking tray in which the sheet is stored is lifted up by the tray lifting portion. And when the sheet surface sensor detects that the sheet in the sheet stacking tray has been lifted up to a feedable position, the tray lifting portion stops the lifting operation of the sheet stacking tray. However, even if the lifting operation of the sheet stacking tray is conducted by the tray lifting portion, the sheet surface sensor cannot detect the sheet in the sheet stacking tray and the lifting operation may not be successfully completed. For example, a method is disclosed in Japanese Laid-Open Patent Application (JP-A) 2008-110861 whereby a lifting malfunction, which is a malfunction in the tray lifting portion, is reported in such a case.

The image forming apparatus described above is provided with a trailing end regulating board to stack the sheet stacking tray so as to align the trailing end of a conveyance direction of the sheet. The configuration is such that, by setting the trailing end regulating board corresponding to the sheet size when stacking the sheet in the sheet stacking tray, the sheet is stacked in a detectable position by the sheet surface sensor. However, if a sheet is stacked and the trailing end regulating board is set in a position corresponding to a larger sheet size than the stacked sheet, the position of the leading end of the conveyance direction of the sheet deviates toward the downstream side of the conveyance direction and may cause an abnormality wherein the sheet surface sensor cannot detect the stacked sheet. In a conventional image forming apparatus, a lifting malfunction may be reported in case of a setting error of the sheet stacking tray by the user. There are also many other factors preventing the lifting operation from being successfully completed, and if the entire applicable unit is replaced when a lifting malfunction is reported, units which do not require replacement may be unnecessarily replaced. As a result, increased time and costs for responding to malfunctions may lead to a reduction in usability.

SUMMARY OF THE INVENTION

In order to resolve the issue described above, the present invention is provided with the following configuration.

An image forming apparatus provided with an image forming portion for forming an image onto a sheet, the image forming apparatus comprising: a stacking portion on which the sheet is stacked and including a lifting portion configured to perform lifting operation; a feeding member configured to feed the sheet stacked on the lifting portion to a conveyance passage of the image forming portion; a position detecting means configured to detect movement of the sheet stacked on the lifting portion to a feedable position to the conveyance passage by the feeding member; a driving means including a motor and configured to perform the lifting operation of the lifting portion by controlling the motor; a rotation detecting means configured to detect rotation of the motor; and a control means configured to control the lifting operation of the lifting portion, wherein the control means determines a factor that the position detecting means does not detect the movement of the sheet stacked on the lifting portion to the feedable position within a predetermined time based on a detection result of the rotation detecting means while controlling the driving means to lift up the lifting portion.

Further features of the present invention will become apparent from the following description of exemplary embodiments with reference to the drawings.

DESCRIPTION OF THE EMBODIMENTS

In the following, embodiments of the present invention will be specifically described with reference to Figures.

Embodiment 1

[Configuration of Image Forming Apparatus]

Figure 1:
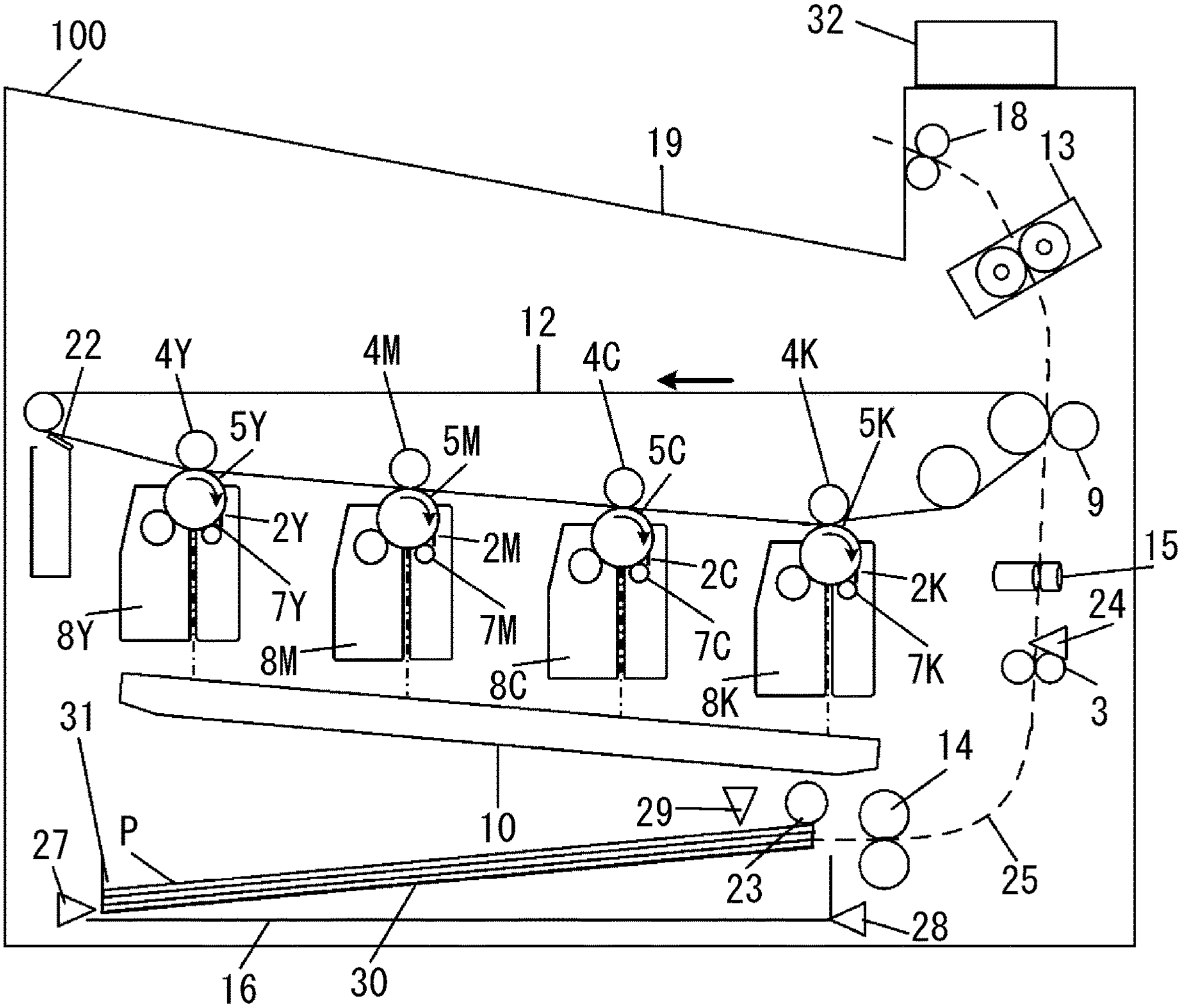
FIG. 1 is a sectional view showing a schematic block of an image forming apparatus according to embodiments 1 and 2.

FIG. 1 is a schematic sectional view showing a configuration of an image forming apparatus 100 to which the present invention is applied. The image forming apparatus 100 is provided with 4 image forming stations (image forming portions) which form a toner image using yellow (Y), magenta (M), cyan (C) and black (K) toners. In FIG. 1, the letters Y, M, C and K suffixed to the reference numerals signify a member of the image forming station which uses the respective yellow, magenta, cyan or black toner. Incidentally, the configuration of each image forming station is the same; therefore, with the exception of cases referring to a member of a specific image forming station, the letter suffixed to the reference numeral indicating the toner color will be omitted.

For each image forming station, a photosensitive drum 5 is an image bearing member and rotates in the direction of the arrow in the figure (clockwise direction) to form an electrostatic latent image and a toner image, which will be described below. A charging unit 7 charges the surface of the photosensitive drum 5 with uniform electric potential. An exposure unit 10 irradiates a light beam corresponding to an image signal to the surface of the photosensitive drum 5, which has been charged with equal electric potential by the charging unit 7, and forms an electrostatic latent image. A developing unit 8 develops the electrostatic latent image formed on the photosensitive drum 5 by adhering toner to the electrostatic latent image, and forms a toner image on the surface of the photosensitive drum 5.

A primary transfer roller 4 is arranged on a position opposing the photosensitive drum 5 on each image forming station, and sequentially superposes the toner image formed on the photosensitive drum 5 and transfers the toner image to an intermediate transfer belt 12. The intermediate transfer belt 12 is an endless belt which is driven by a driving roller and rotates in the direction of the arrow in the figure (counterclockwise direction). Toner images of differing colors from the photosensitive drum 5 of each image forming station are superposed and transferred to the intermediate transfer belt 12 to form a color image. And the color image on the intermediate transfer belt 12 is conveyed to a secondary transfer portion, which is a nip portion in which the intermediate transfer belt 12 contacts a secondary transfer roller 9.

A drum cleaner 2 removes any residual toner left on the photosensitive drum 5 which was not transferred to the intermediate transfer belt 12. On the other hand, a belt cleaner 22 removes any toner left on the intermediate transfer belt 12 which was not transferred from the intermediate transfer belt 12, which will be described below, to a sheet P.

A sheet cassette 16 is a stacking portion which stores the sheet (paper) P, which is a recording material that forms an image in the image forming station. A sheet trailing end regulating board 31 is a regulating portion which is movably disposed on a lifting plate 30, which will be described below, and regulates so as to align the trailing end position of the conveyance direction of the sheet P so that the sheet P will not be stored in a deviated position by the sheet cassette 16. A pickup roller 23 is a feed member which picks up the sheet P stored in the sheet cassette 16 and feeds it to a conveyance passage 25. A conveyance roller 14 further conveys the sheet P fed from the pickup roller 23 to the downstream side of the conveyance passage 25. A resist roller 3 conveys the sheet P to the secondary transfer portion so that the timing of the arrival of the toner image, which has been transferred on to the intermediate transfer belt 12, at the secondary transfer portion coincides with the timing of the arrival of the sheet P at the secondary transfer portion.

The secondary transfer portion is a nip portion which is formed by the intermediate transfer belt 12 contacting the secondary transfer roller 9. By conveying the sheet P while it is clamped between the secondary transfer roller 9 and the intermediate transfer belt 12, the toner image, which is a color image formed on the intermediate transfer belt 12, is transferred on to the sheet P in the secondary transfer portion. The sheet P, onto which the toner image has been transferred, is conveyed to a fixing portion 13.

In a fixing device 13, the sheet P is heated and pressed, and the toner image is fixed to sheet P. Thereafter, the sheet P onto which the toner image has been fixed is discharged onto a discharge tray 19.

Incidentally, a display portion 32, which includes a panel in which the state of the image forming apparatus 100 is displayed and in which data is entered, is provided on the exterior of the image forming apparatus 100, in the vicinity of a discharge roller 18.

A sheet detector 27 is a detector which detects the presence of the sheet P inside the sheet cassette 16. Further, a cassette detector 28 is a detector which detects when the sheet cassette 16 has been pulled out from the image forming apparatus 100, and when the sheet cassette 16 has been pushed into and mounted on the image forming apparatus 100. To replenish or replace the sheet P, the user pulls the sheet cassette 16 out from the image forming apparatus 100 to replenish the sheet P in the sheet cassette 16 or to replace the stored sheet P with another sheet P. And when the sheet P has been stored in the sheet cassette 16, the user pushes the sheet cassette 16 into the image forming apparatus 100 and mounts it on the image forming apparatus 100. When the cassette detector 28 detects that the sheet cassette 16 has been mounted on the image forming apparatus 100, a lifting motor 221 (see FIG. 2) is driven and lifts the lifting plate 30, which is a lifting portion in which the sheet P is stacked. As a result, the sheet P stacked in the highest position on the lifting plate 30 moves to a predetermined feed position. When a sheet surface sensor 29, which is a position detecting means, detects the sheet P stacked in the highest position on the lifting plate 30, the lifting motor 221 is stopped.

[Control Configuration of Sheet Cassette Lifting Mechanism]

Figure 2:
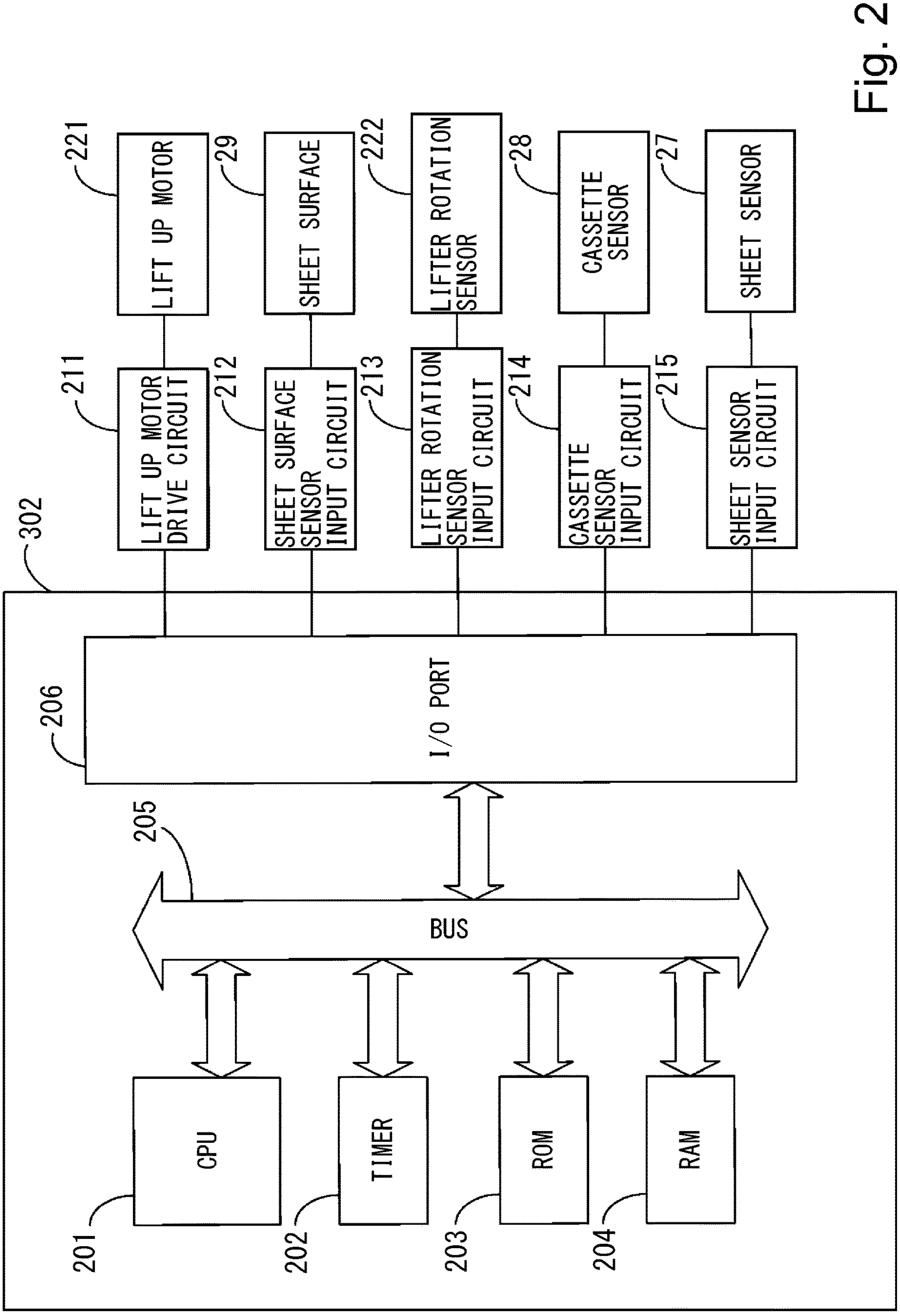
FIG. 2 is a hardware block diagram of the image forming apparatus according to the embodiments 1 and 2.

FIG. 2 is a hardware block diagram of an engine control portion 302 (see FIG. 3), which will be described below, which relates to the lifting mechanism of the sheet cassette 16 in which the sheet P is stacked in the image forming apparatus 100 of the present embodiment. The engine control portion 302 includes a CPU 201, which executes various control operations related to image formation, a RAM 204, which temporarily stores data required for the operation of the image forming apparatus 100, and a ROM 203, which stores control data required for the operation of the image forming apparatus 100. Further, the engine control portion 302 includes a timer 202, which generates the timing required for various control operations and measures time, and an I/O port 206, which performs the input and output of control signals to various units. And the CPU 201, the RAM 204, the ROM 203, the timer 202 and the I/O port 206 described above are connected via a bus 205 in the engine control portion 302.

As shown in FIG. 2, a lifting motor driving circuit 211, which drives the lifting motor 221, and a position detector input circuit 212, into which a detection signal from the sheet surface sensor 29 is inputted, are connected to the I/O port 206. Further, a lifter rotation detector input circuit 213, into which a detection signal from a lifter rotation detector 222 is inputted, and a cassette detector input circuit 214, into which a detection signal from the cassette detector 28 is inputted, are connected to the I/O port 206. Furthermore, a cassette detector input circuit 215, into which a detection signal from the sheet detector 27 is inputted, is connected to the I/O port 206.

The CPU 201 controls the rotation (drive) and rotation stop (drive stop) of the lifting motor 221 by outputting a control signal to the lifting motor driving circuit 211, which is connected to the I/O port 206 via the bus 205. Further, the CPU 201 obtains a detection signal of the sheet surface sensor 29 and a detection signal of the lifter rotation detector 222 via the bus 205 respectively from the position detector input circuit 212 and the lifter rotation detector input circuit 213, which are connected to the I/O port 206. Furthermore, the CPU 201 obtains a detection signal of the cassette detector 28 and a detection signal of the sheet detector 27 via the bus 205 respectively from the cassette detector input circuit 214 and the cassette detector input circuit 215, which are connected to the I/O port 206.

[Functional Blocks in Sheet Cassette Lifting Control]

Figure 3:
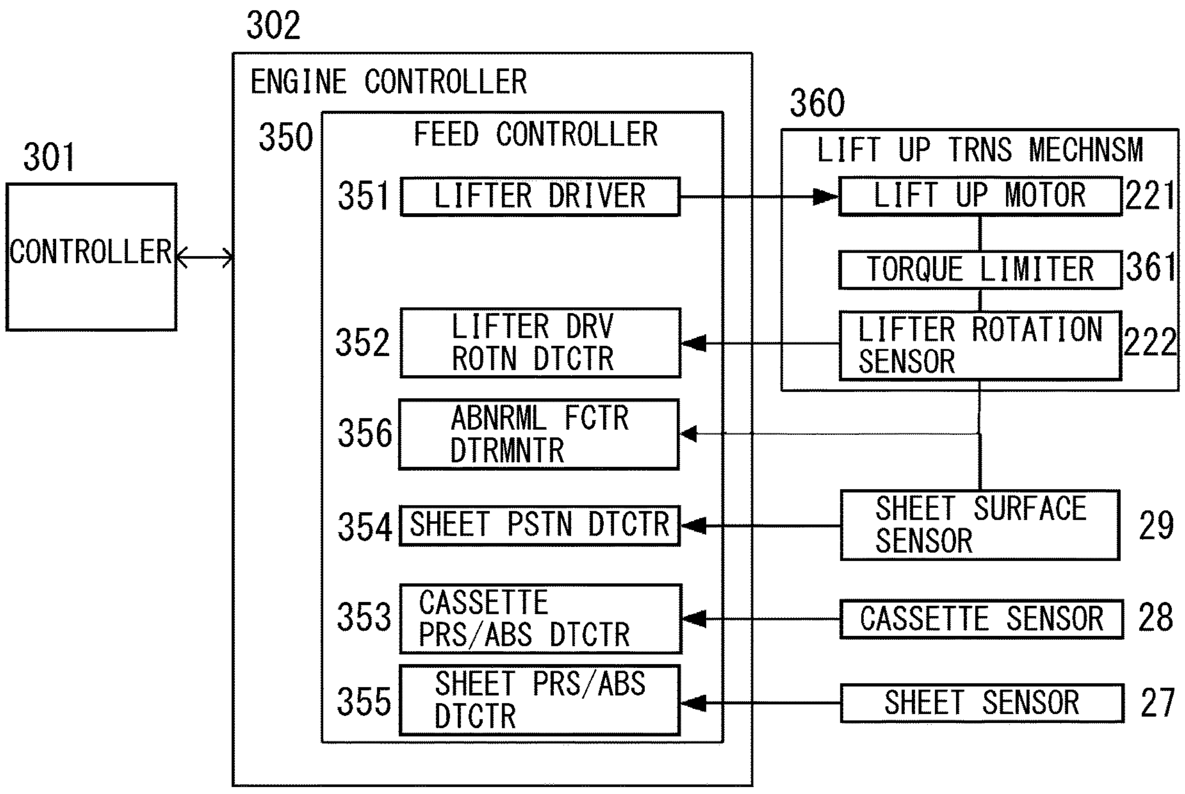
FIG. 3 is a control block diagram of the image forming apparatus according to the embodiments 1 and 2.

Next, a function related to a lifting control of the sheet cassette 16 in the engine control portion 302 will be described. FIG. 3 is a block diagram describing the relationship between a functional block related to the lifting control of the sheet cassette 16 in the engine control portion 302 and the lifting mechanism of the sheet cassette 16 described above.

In FIG. 3, a controller 301 receives print data and print instructions transmitted from a host computer (not shown), which is an external device that performs print requests to the image forming apparatus 100, and transmits the print data and print instructions to the engine control portion 302. The engine control portion 302 includes the CPU 201, the RAM 204, the ROM 203, and the timer 202 described above, and performs image forming control based on print data and print instructions received from the controller 301. A feed controller portion 350 shown in FIG. 3 is a control means which controls the lifting plate 30 during a feed control of the sheet P during image formation, and when the sheet cassette 16 is mounted on the image forming apparatus 100. Incidentally, the function of the functional block shown in the feed controller portion 350 in FIG. 3 is realized when the CPU 201 executes a program stored in the ROM 203 based on data stored in the RAM 204.

As shown in FIG. 3, the feed controller portion 350 includes functional blocks in a lifter driving portion 351, a lifter driving rotation detecting portion 352, a cassette detecting portion 353, a sheet position detecting portion 354, a sheet detecting portion 355, and an abnormality factor specifying portion 356. The lifter driving portion 351 is a driving means which controls a lifting transmission mechanism 360, which is a transmission portion, so as to control the driving of the lifting motor 221. Incidentally, the configuration of the lifting transmission mechanism 360 will be described below. The lifter driving rotation detecting portion 352 detects the rotational state of the lifting motor 221 based on information obtained from the lifter rotation detector 222, which constitutes the lifting transmission mechanism 360, which is a rotation detecting means. The cassette detecting portion 353, which is a mount detecting means, obtains a detection signal from the cassette detector 28 and detects the attachment state of the sheet cassette 16 to the image forming apparatus 100. The sheet position detecting portion 354 detects the position of the sheet P based on detection information of the sheet P stacked in the highest position on the lifting plate 30 from the sheet surface sensor 29. The sheet detecting portion 355 obtains a detection signal from the sheet detector 27 and detects the presence of the sheet P inside the sheet cassette 16. The abnormality factor specifying portion 356 specifies a failure factor based on detection results from the lifter rotation detector 222 and the sheet surface sensor 29 when the lifting of the lifting plate 30 fails.

When the cassette detecting portion 353 detects that the sheet cassette 16 has been mounted on the image forming apparatus 100 by the cassette detector 28, the feed controller portion 350 performs the lifting control of the lifting plate 30 of the sheet cassette 16. The lifter driving portion 351 drives the lifting motor 221, which constitutes the lifting transmission mechanism 360, and performs the lifting operation of the lifting plate 30 inside the sheet cassette 16. When the sheet position detecting portion 354 detects that the lifting plate 30 has been lifted to the predetermined position based on a detection signal obtained from the sheet surface sensor 29, the lifter driving portion 351 stops the rotation of the lifting motor 221. At this moment, the lifter driving rotation detecting portion 352 detects whether a lifting transmission gear 404 (see FIG. 4) is rotating based on rotation information obtained from the lifter rotation detector 222. Further, a torque limiter 361 shuts off the transmission of the driving of the lifting motor 221 when a torque (load) of a predetermined amount or more is applied so as to prevent damage to the sheet cassette 16 and the lifting transmission mechanism 360.

[Lifting Transmission Mechanism]

Figure 4:
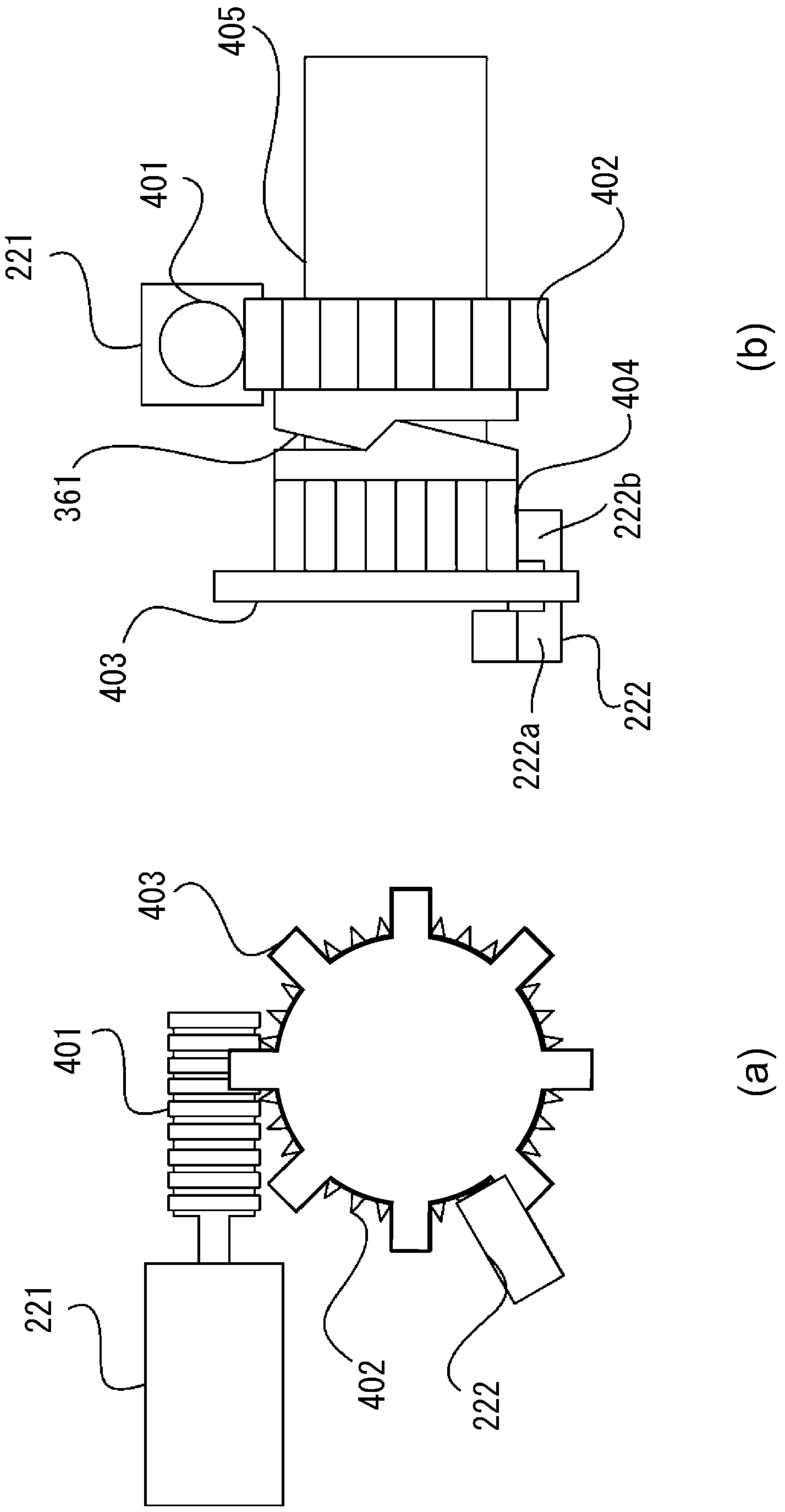
FIG. 4, part (a) and part (b), is a figure describing a configuration of a lifting transfer mechanism according to the embodiments 1 and 2.

FIG. 4, part (a) and part (b), is a figure describing a configuration of the lifting transmission mechanism 360. FIG. 4 (*a*) is a front view showing the configuration of the lifting transmission mechanism 360 as seen from the front side. FIG. 4 (*b*) is a side view showing the configuration of the lifting transmission mechanism 360 as seen from the side.

As shown in FIG. 4, the lifting transmission mechanism 360 includes a worm 401, which rotates along with the rotation of the lifting motor 221 and transmits the driving, and a worm wheel 402, which meshes with the worm 401 and rotates in synchronization with the rotation of the worm 401. Further, the lifting transmission mechanism 360 includes the lifting transmission gear 404, which transmits the rotation drive from the worm wheel 402, and a spring 405, which urges the lifting transmission gear 404 and pushes it toward the side of the worm wheel 402. The torque limiter 361 is provided between the worm wheel 402 and the lifting transmission gear 404, and shuts off the transmission of the rotation drive of the worm wheel 402 to the lifting transmission gear 404 when a torque of the predetermined amount or more is applied.

Further, the lifter rotation detector 222 detects whether the lifting transmission gear 404 is rotating by detecting a rotating flag 403, which is provided on the same axis as the lifting transmission gear 404. As shown in FIG. 4 (*b*), the lifter rotation detector 222 is U-shaped with a slit portion in the center. And a protruding portion 222*a* on one end of the U-shape includes a light-emitting portion, while a protruding portion 222*b* on the other end of the U-shape includes a light-receiving portion which detects a light beam emitted from the light-emitting portion of the protruding portion 222*a*. The rotating flag 403 is provided on the same axis as the lifting transmission gear 404, and is driven and rotated when the lifting transmission gear 404 is rotated. Wings are provided in equal intervals on the circumference of the rotating flag 403. These wings rotate when the rotating flag 403 rotates and pass through the slit portions between the protruding portions 222*a* and 222*b* on the lifter rotation detector 222. During this time, the light beam emitted from the light-emitting portion of the protruding portion 222*a* is shielded by the wings on the rotating flag 403 when the light beam passes through the rotating flag 403. The lifter rotation detector 222 detects that the lifting transmission gear 404 is rotating when the protruding portion 222*b* is unable to detect the light beam emitted by the light-emitting portion of the protruding portion 222*a* because the light beam is shielded by the wings on the rotating flag 403.

Figure 5:
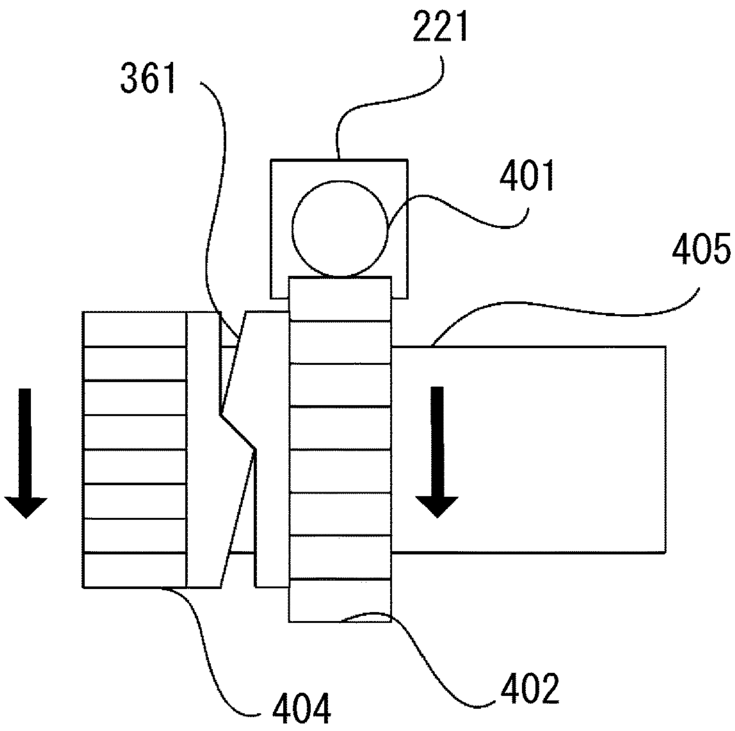
FIG. 5, part (a) and part (b), is a figure describing an operation of a torque limiter according to the embodiments 1 and 2.
Figure 5:
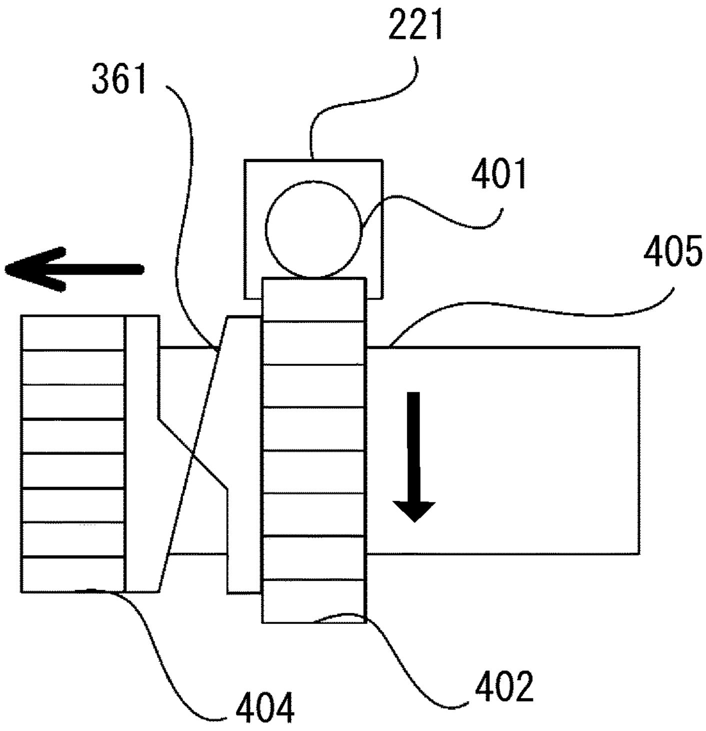

FIG. 5, part (a) and part (b), is a figure describing the driving from the lifting motor 221 being transmitted to the lifting transmission gear 404 via the torque limiter 361. As shown in FIG. 5 (*a*), the rotation of the lifting motor 221 is transmitted via the worm 401 to the worm wheel 402 which meshes with the worm 401, and the worm wheel 402 rotates in the direction of the arrow in the figure. In FIG. 5 (*a*), the strength of the spring 405 pushing the lifting transmission gear 404 to the side of the worm wheel 402 by urging the lifting transmission gear 404 is stronger than the frictional force of the torque limiter 361. For this reason, the worm wheel 402 engages with the lifting transmission gear 404, the driving of the lifting motor 221 is transmitted to the lifting transmission gear 404, and the lifting transmission gear 404 rotates in the same direction as the worm wheel 402, which is the same direction as the arrow in the figure. And the rotation of the lifting transmission gear 404 drives the lifting mechanism of the lifting plate 30, and the lifting plate 30 is lifted up toward the sheet surface sensor 29.

On the other hand, FIG. 5 (*b*) is a figure describing the driving from the lifting motor 221 being shielded by the torque limiter 361. When the torque from the lifting motor 221 increases, the frictional force of the torque limiter 361 becomes stronger than the strength of the spring 405 pushing the lifting transmission gear 404 toward the worm wheel 402 by urging the lifting transmission gear 404. For this reason, the lifting transmission gear 404 moves in the direction of the arrow in the figure, and the engagement between the worm wheel 402 and the lifting transmission gear 404 is dissolved. As a result, the rotation of the worm wheel 402 rotating in the direction of the arrow in the figure by the driving from the lifting motor 221 is no longer transmitted to the lifting transmission gear 404.

[Setting of Sheet Trailing End Regulating Board]

Figure 6:
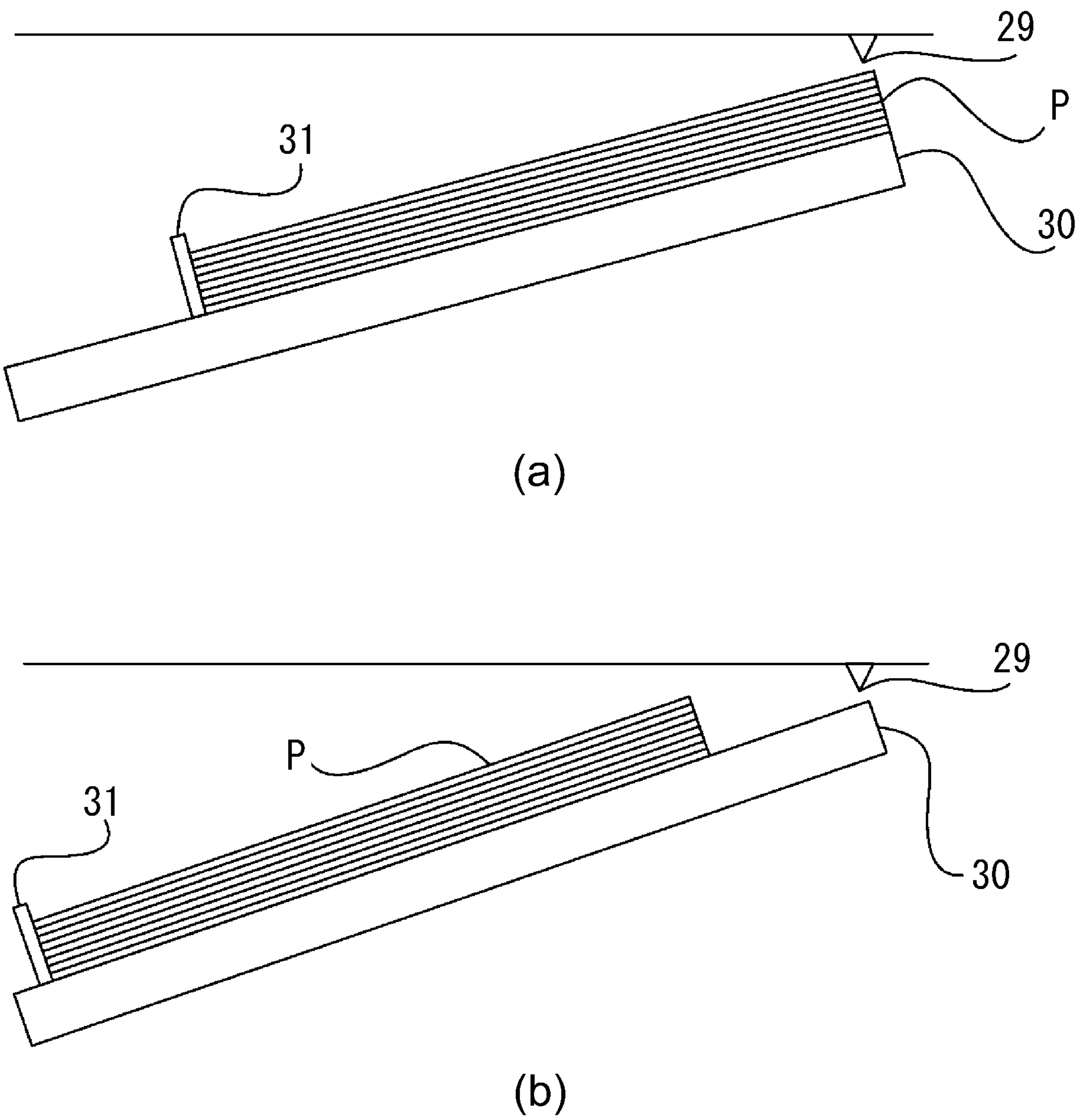
FIG. 6, part (a) and part (b), is a figure describing a difference in a lifting operation depending on a set position of a sheet trailing end regulating board according to the embodiments 1 and 2.

FIG. 6, part (a) and part (b), is a figure showing the sheet surface sensor 29 detecting the sheet P stacked in the highest position in the lifting plate 30. As described above, the sheet trailing end regulating board 31 is provided to align the trailing end position of the conveyance direction of the sheet P so that the sheet P will not be stacked in a deviated position on the lifting plate 30. In FIG. 6 (*a*), the sheet trailing end regulating board 31 is set so that the leading end portion of the conveyance direction (the right direction in the figure) of the sheet P, which is stacked on the lifting plate 30, is positioned in the vicinity of the leading end of the lifting plate 30. For this reason, when the lifting motor 221 is driven and the lifting plate 30 is lifted up, the sheet surface sensor 29 detects the sheet P on the lifting plate 30, and the lifting operation is successfully completed.

On the other hand, FIG. 6 (*b*) is a figure showing the sheet surface sensor 29 not detecting the sheet P stacked in the highest position on the lifting plate 30. In FIG. 6 (*b*), the sheet trailing end regulating board 31 is set so that the leading end portion of the conveyance direction (the right direction in the figure) of the sheet P, which is stacked on the lifting plate 30, is positioned on further downstream of the conveyance direction of the sheet P than the position of the sheet surface sensor 29. For this reason, the sheet surface sensor 29 cannot detect the sheet P on the lifting plate 30 even when the lifting motor 221 is driven and the lifting plate 30 is lifted because the sheet P is not set in the position where it should be stacked. For this reason, the lifting operation is not successfully completed and fails.

[Determining Factors of Lifting Operation Failures]

In the configuration of the present embodiment described above, the way in which factors of lifting operation failures are specified will be described. If the lifting operation of the lifting plate 30 has failed but the lifting transmission mechanism 360 is operating normally, the lifter rotation detector 222 detects the rotation of the lifting transmission gear 404 while the lifting motor 221 is being driven. Therefore, if the lifting motor 221 is being driven but the lifter rotation detector 222 does not detect the rotation of the lifting transmission gear 404, the lifting plate 30 is not lifted up, resulting in the failure of the lifting operation. For this reason, in such a case, it can be determined that a malfunction has occurred in the lifting transmission mechanism 360.

Further, if the lifting operation has failed, but the lifting motor 221 is being driven and the lifter rotation detector 222 detects the rotation of the lifting transmission gear 404, this indicates that the lifting plate 30 has been partially lifted up. For this reason, in such a case, it is presumed that a malfunction has occurred in the sheet surface sensor 29, or that the sheet trailing end regulating board 31 has not been correctly set and the sheet P has been stacked in a deviated position. For this reason, the sheet surface sensor 29 cannot detect the sheet P on the lifting plate 30; therefore, it can be determined that the lifting operation has failed. Accordingly, furthermore, in order to specify the factor of the incompletion of the lifting operation, the lifting operation of the lifting plate 30 is executed again after the user resets the position of the sheet trailing end regulating board 31 of the sheet cassette 16. And if the lifting operation of the lifting plate 30 fails again, it is presumed that the sheet trailing end regulating board 31 is set in the correct position, and it can be determined that a malfunction has occurred in the sheet surface sensor 29.

[Lifting Control of Lifting Plate]

Figure 7:
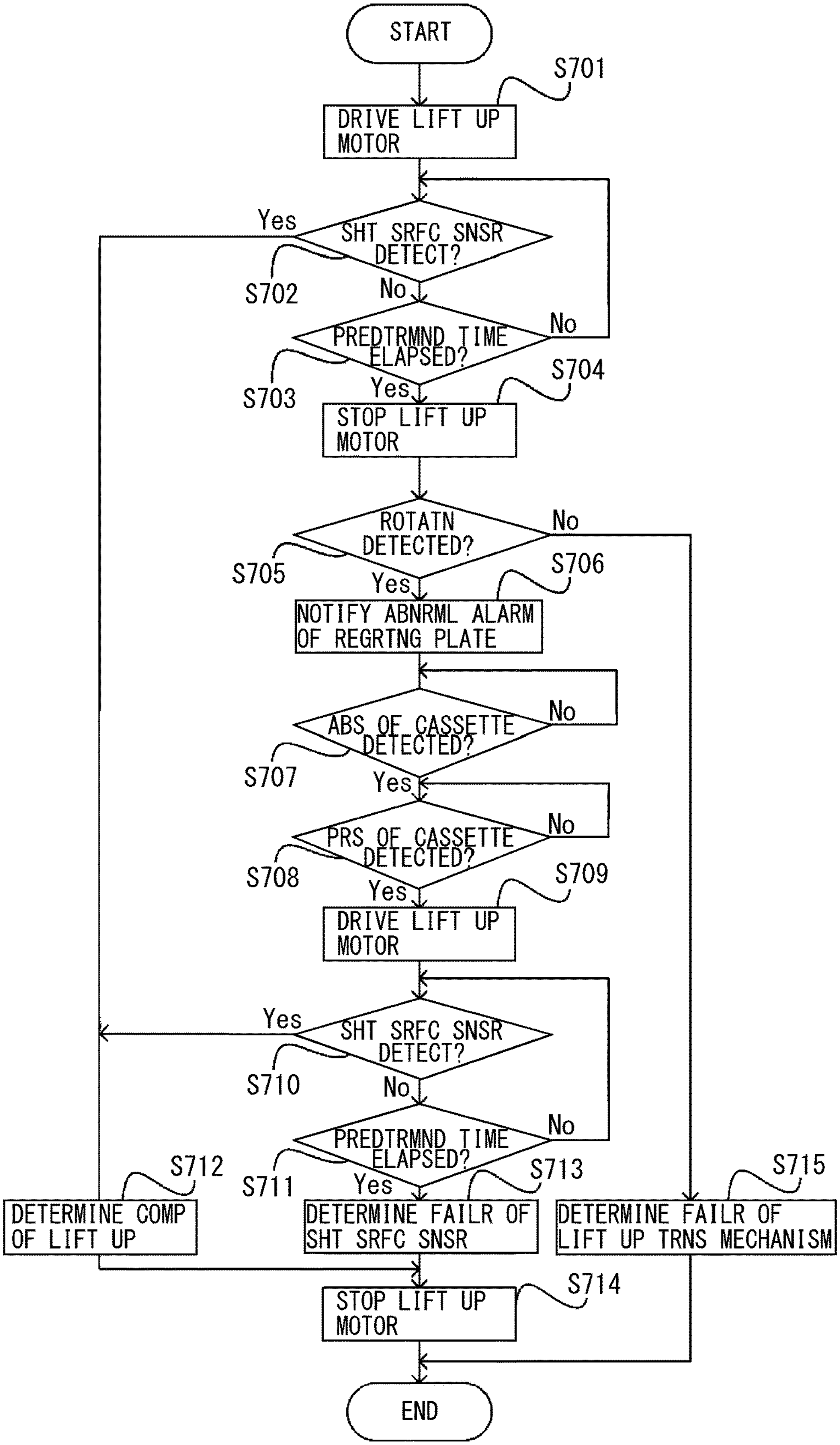
FIG. 7 is a flow chart showing a lifting control of a lifting plate according to the embodiment 1.

Next, the lifting control of the lifting plate 30 in the present embodiment will be described. FIG. 7 is a flow chart showing a control sequence of the lifting control of the lifting plate 30. The process in FIG. 7 is started when the sheet cassette 16 is inserted into the image forming apparatus 100, and the cassette detection portion 353 of the feed controller portion 350 detects that the sheet cassette 16 has been mounted on the image forming apparatus 100 based on a detection result of the cassette detector 28. Further, the process shown in FIG. 7 is executed when the feed controller portion 350 controls the respective control portions described in FIG. 3. Incidentally, the timing of the start of the process in FIG. 7 is the moment when the sheet cassette 16 is mounted on the image forming apparatus 100 and the lifting operation of the lifting plate 30 has not been executed. For this reason, the sheet surface sensor 29 is not detecting the sheet P on the lifting plate 30.

In a step (hereinafter referred to as S) 701, the feed controller portion 350 resets and starts the timer 202 while driving the lifting motor 221 by controlling the lifter driving portion 351 so as to perform the lifting operation of the lifting plate 30. In S702, the feed controller portion 350 controls the sheet position detecting portion 354 and obtains a detection result of the sheet surface sensor 29 so as to determine whether the sheet surface sensor 29 detected the sheet P on the lifting plate 30 (indicated as "Sheet surface sensor detected?" in the figure). If the feed controller portion 350 determines that the sheet surface sensor 29 detected the sheet P on the lifting plate 30, the feed controller portion 350 proceeds the process to S712, and if the feed controller portion 350 determines that the sheet surface sensor 29 did not detect the sheet P on the lifting plate 30, the feed controller portion 350 proceeds the process to S703. In S703, the feed controller portion 350 refers to the timer and determines if a predetermined amount of time has elapsed. If the feed controller portion 350 determines that the predetermined amount of time has elapsed, the feed controller portion 350 determines that the lifting operation of the lifting plate 30 has failed and proceeds the process to S704, and if the feed controller portion 350 determines that the predetermined amount of time has not elapsed, the feed controller portion 350 returns the process to S702. Incidentally, the predetermined amount of time is the maximum time required from when the lifting motor 221 is driven until the sheet surface sensor 29 detects the sheet P on the lifting plate 30.

In S704, the sheet surface sensor 29 did not detect the sheet P on the lifting plate 30 within the predetermined amount of time; therefore, the feed controller portion 350 determines that the lifting operation of the lifting plate 30 has failed. And the feed controller portion 350 controls the lifter driving portion 351 so as to stop the driving of the lifting motor 221.

In S705, the feed controller portion 350 obtains a detection result from the lifter driving rotation detecting portion 352 of the rotational state of the lifting transmission gear 404 by the lifter rotation detector 222 while the lifting motor 221 was being driven by the lifter driving rotation detecting portion 352. Based on the detection result obtained, the feed controller portion 350 determines if the lifter rotation detector 222 detected the rotation of the lifting transmission gear 404 (indicated as "Rotation detected?" in figure). If the feed controller portion 350 determines that the lifter rotation detector 222 detected the rotation of the lifting transmission gear 404, the feed controller portion 350 proceeds the process to S706, and if the feed controller portion 350 determines that the lifter rotation detector 222 did not detect the rotation, the feed controller portion 350 proceeds the process to S715.

In S706, the feed controller portion 350 notifies the engine control portion 302 of a defective setting in which the sheet trailing end regulating board 31 of the lifting plate 30 is not set to a position according to the size of the conveyance direction of the sheet P stacked on the lifting plate 30. The engine control portion 302 alerts the user by displaying a sheet regulating board abnormality warning on the display portion 32 so as to urge the user to check the set position of the sheet trailing end regulating board 31.

In S707, the feed controller portion 350 controls the cassette detection portion 353 and obtains a detection result of the cassette detector 28. Based on the detection result of the cassette detector 28, the feed controller portion 350 determines whether the sheet cassette 16 has been pulled out from the image forming apparatus 100 (indicated as "No cassette detected?" in figure). If the feed controller portion 350 determines that the sheet cassette 16 has been pulled out from the image forming apparatus 100, the feed controller portion 350 proceeds the process to S708, and if the feed controller portion 350 determines that the sheet cassette 16 has not been pulled out from the image forming apparatus 100, the feed controller portion 350 returns the process to S707. In S708, the feed controller portion 350 controls the cassette detection portion 353 and obtains a detection result of the cassette detector 28. Based on the detection result of the cassette detector 28, the feed controller portion 350 determines whether the sheet cassette 16 has been mounted on the image forming apparatus 100 (indicated as "Cassette detected?" in figure). If the feed controller portion 350 determines that the sheet cassette 16 has been mounted on the image forming apparatus 100, the feed controller portion 350 proceeds the process to [an] S709, and if the feed controller portion 350 determines that the sheet cassette 16 has not been mounted on the image forming apparatus 100, the feed controller portion 350 returns the process to S708.

In S709, the feed controller portion 350 resets and starts the timer 202 while driving the lifting motor 221 by controlling the lifter driving portion 351 so as to perform the lifting operation of the lifting plate 30. In S710, the feed controller portion 350 obtains a detection result of the sheet surface sensor 29 by controlling the sheet position detecting portion 354 and determines whether the sheet surface sensor 29 detected the sheet P on the lifting plate 30 (indicated as "Sheet surface sensor detected?" in figure). If the feed controller portion 350 determines that the sheet surface sensor 29 detected the sheet P on the lifting plate 30, the feed controller portion 350 proceeds the process to S712, and if the feed controller portion 350 determines that the sheet surface sensor 29 did not detect the sheet P on the lifting plate 30, the feed controller portion 350 returns the process to S711. In S711, the feed controller portion 350 refers to the timer 202 and determines whether the predetermined amount of time has elapsed. If the feed controller portion 350 determines that the predetermined amount of time has elapsed, the feed controller portion 350 determines that the lifting operation of the lifting plate 30 has failed and proceeds the process to S713, and if the feed controller portion 350 determines that the predetermined amount of time has not elapsed, the feed controller portion 350 returns the process to S710.

In S712, the feed controller portion 350 determines that the lifting operation of the lifting plate 30 has been successfully completed, notifies this to the engine control portion 302, and proceeds the process to S714. In S713, the feed controller portion 350 determines that the lifting operation of the lifting plate 30 was not completed within the predetermined amount of time due to a malfunction in the sheet surface sensor 29, notifies this to the engine control portion 302, and proceeds the process to S714. The engine control portion 302 displays the malfunction in the sheet surface sensor 29 on the display portion 32 to alert the user.

In S714, the feed controller portion 350 controls the lifter driving portion 351, stops the driving of the lifting motor 221, and completes the process. In S715, the feed controller portion 350 determines that the lifting operation of the lifting plate 30 was not completed within the predetermined amount of time due to a malfunction in the lifting transmission mechanism 360, notifies this to the engine control portion 302, and completes the process. The engine control portion 302 displays the malfunction in the lifting transmission mechanism 360 on the display portion 32 to alert the user.

As described above, the lifting transmission mechanism 360 is provided with the torque limiter 361, which is between the lifting motor 221 and the lifting transmission gear 404, and which shuts off the transmission of the driving of the lifting motor 221. Further, the lifter rotation detector 222, which detects the driving of the lifting transmission gear 404, is provided in the present embodiment. When the lifting operation of the lifting plate 30 fails, it can be determined whether the driving of the lifting motor 221 was transmitted to the lifting transmission gear 404 based on a detection result of the lifter rotation detector 222. If it is likely that a setting error of the sheet trailing end regulating board 31 by user operation is the failure factor of the lifting operation, the factor of the lifting failure can be specified by setting the sheet trailing end regulating board 31 of the sheet cassette 16 in the proper position and reperforming the lifting operation. In this way, in the present embodiment, when the lifting operation fails, the failure factor can be specified as a setting error of the sheet trailing end regulating board 31, a malfunction in the sheet surface sensor, or a malfunction in the lifting transmission mechanism. As a result, if user operation is the cause of the lifting operation failure, the user operation error can be alerted, and if the image forming apparatus 100 is the cause of the lifting operation failure, the unit in which the abnormality has occurred can be specified, allowing the unit replacement etc.

to be handled in a short period of time. Especially in the case of a setting error of the sheet trailing end regulating board 31 caused by the user, the user themself can return the sheet cassette 16 to a normal position. For this reason, the trouble of contacting a serviceperson or having a serviceperson deal with the abnormality, as well as the need to wait for a serviceperson to finish dealing with the abnormality are eliminated, resulting in improved usability.

As described above, according to the present embodiment, usability can be improved for abnormalities occurring during the lifting of the sheet stacking tray.

Embodiment 2

In the embodiment 1, an embodiment was described in which the lifting operation is successfully completed or the failure factor is specified so as to isolate whether the lifting operation failure has been caused by a user operation error by alerting the user to reperform the operation. In the embodiment 2, an embodiment will be described in which the factor of the lifting operation failure is specified through user assistance even if the lifting operation failure is not due to an error in user operation. Incidentally, the configuration of the image forming apparatus, the system configuration and the functional blocks related to the lifting control in the present embodiment are the same as in the embodiment 1; therefore, the same reference numerals will be used for members and apparatuses which are the same members and apparatuses as in the embodiment 1, and explanations will be omitted.

[Determining Factors of Lifting Operation Failures]

In the configuration of the present embodiment, the way in which factors of lifting operation failures are specified will be described. If the lifting operation of the lifting plate 30 has failed but the lifting transmission mechanism 360 is operating normally, the lifter rotation detector 222 detects the rotation of the lifting transmission gear 404 while the lifting motor 221 is being driven. Therefore, if the lifting motor 221 is being driven but the lifter rotation detector 222 does not detect the rotation of the lifting transmission gear 404, the lifting plate 30 is not lifted, resulting in the failure of the lifting operation. In such a case, it is presumed that either a malfunction in the sheet cassette 16 or that a malfunction in the lifting transmission mechanism 360 has occurred. For this reason, the user removes the sheet cassette 16 mounted on the image forming apparatus 100 and drives the lifting motor 221 without the sheet cassette 16 being mounted on the image forming apparatus 100 so as to specify the failure factor of the lifting operation. And if the lifter rotation detector 222 detects the rotation of the lifting transmission gear 404, it is likely that the lifting transmission mechanism 360 is operating correctly; therefore, it can be determined that a malfunction has occurred in the sheet cassette 16. On the other hand, if the lifter rotation detector 222 does not detect the rotation of the lifting transmission gear 404 even when the sheet cassette 16 is not mounted on the image forming apparatus 100, it is likely that the lifting transmission mechanism 360 is not operating correctly. For this reason, a malfunction in the lifting transmission mechanism 360 can be determined to be the failure factor of the lifting operation.

[Lifting Control of Lifting Plate]

Figure 8:
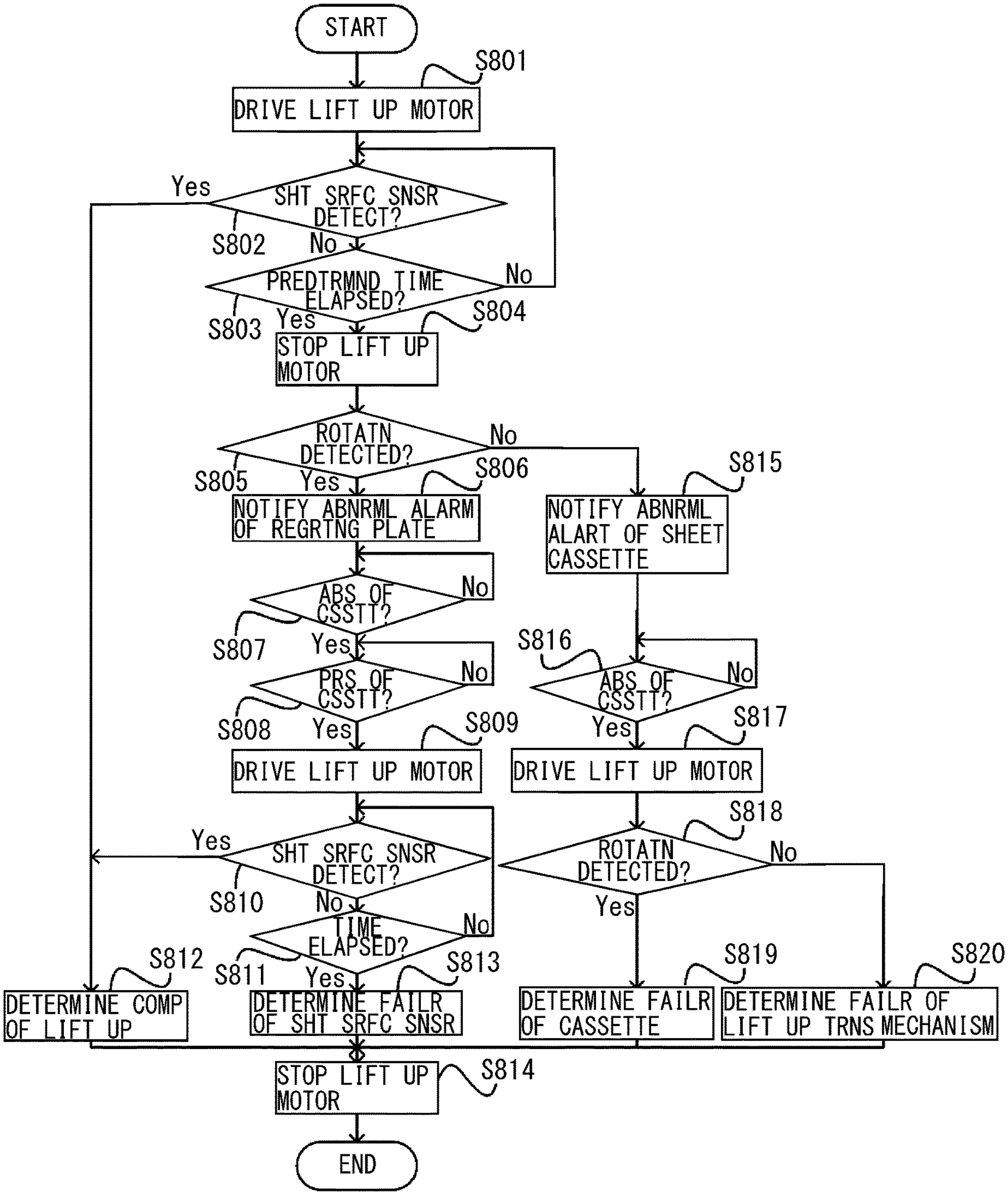
FIG. 8 is a flow chart showing the lifting control of the lifting plate according to the embodiment 2.

Next, the lifting control of the lifting plate 30 in the present embodiment will be described. FIG. 8 is a flow chart showing a control sequence of a lifting control of the lifting plate 30. The process in FIG. 8 is started when the sheet cassette 16 has been inserted into the image forming apparatus 100 and the cassette detection portion 353 of the feed controller portion 350 detects that the sheet cassette 16 has been inserted into the image forming apparatus 100 based on a detection result of the cassette detector 28. Incidentally, the process shown in FIG. 8 is executed when the feed controller portion 350 controls the respective control portions described in FIG. 3 of the embodiment 1. Further, the timing of when the process in FIG. 8 is started is the moment when the sheet cassette 16 is inserted into the image forming apparatus 100, at which point the lifting operation of the lifting plate 30 is not being executed. For this reason, the sheet surface sensor 29 is not detecting the sheet P on the lifting plate 30.

The processes in S801 to S814 are the same as the processes in S701 to S714 in FIG. 7 of the embodiment 1, and explanations will be omitted. In S815, the feed controller portion 350 notifies the engine control portion 302 of an abnormal warning in the cassette 16, which indicates an abnormality in the lifting mechanism of the sheet cassette 16. The engine control portion 302 displays a sheet cassette abnormal warning on the display portion 32 and urges the user to remove the sheet cassette 16 from the image forming apparatus 100. In [an] S816, the feed controller portion 350 controls the cassette detection portion 353 so as to obtain a detection result of the cassette detector 28. The feed controller portion 350 determines whether the sheet cassette 16 has been pulled out from the image forming apparatus 100 based on a detection result of the cassette detector 28 (indicated as "No cassette detected?" in figure). If the feed controller portion 350 determines that the sheet cassette 16 has been pulled out from the image forming apparatus 100, the feed controller portion 350 proceeds the process to S817, and if the feed controller portion 350 determines that the sheet cassette 16 has not been pulled out from the image forming apparatus 100, the feed controller portion 350 returns the process to S816.

In S817, the feed controller portion 350 controls the lifter driving portion 351 and drives the lifting motor 221 so as to perform the lifting operation of the lifting plate 30. In S818, the feed controller portion 350 obtains a detection result from the lifter driving rotation detecting portion 352 of the rotational state of the lifting transmission gear 404 by the lifter rotation detector 222 while the lifting motor 221 was being driven. The feed controller portion 350 determines whether the lifter rotation detector 222 detected the rotation of the lifting transmission gear 404 based on the detection result obtained (indicated as "Rotation detected?" in figure). If the feed controller portion 350 determines that the lifter rotation detector 222 detected the rotation of the lifting transmission gear 404, the feed controller portion 350 proceeds the process to S819, and if the feed controller portion 350 determines that the lifter rotation detector 222 did not detect the rotation, the feed controller portion 350 proceeds the process to S820.

In S819, the feed controller portion 350 determines that the lifting operation of the lifting plate 30 was not completed within the predetermined amount of time due to a malfunction in the sheet cassette 16, notifies this to the engine control portion 302, and proceeds the process to S814. The engine control portion 302 displays the malfunction in the sheet cassette 16 on the display portion 32 and alerts the user. In S820, the feed controller portion 350 determines that the lifting operation of the lifting plate 30 was not completed within the predetermined amount of time due to a malfunction in the lifting transmission mechanism 360, notifies this to the engine control portion 302, and proceeds the process to S814. The engine control portion 302 displays the malfunction in the lifting transmission mechanism 360 on the display portion 32 and alerts the user.

As described above, according to the present embodiment, if the lifting operation of the lifting plate 30 fails and it is determined that the failure factor is not due to an abnormality in user operation, the attachment/detachment operation of the sheet cassette 16 is performed through user assistance so as the specify the malfunction factor. As a result, the failure factor can be determined to be a malfunction in the sheet cassette 16 or a malfunction in the lifting transmission mechanism 360, thereby eliminating the need for unnecessary unit replacements and improving usability.

As described above, according to the present embodiment, usability can be improved for abnormalities occurring during the lifting of the sheet stacking tray.

According to the present invention, usability can be improved for abnormalities occurring during the lifting of the sheet stacking tray.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-204612 filed on Dec. 16, 2021, which is hereby incorporated by reference herein in its entirety.

What is claimed is:

1. An image forming apparatus provided with an image forming portion for forming an image onto a sheet, the image forming apparatus comprising:
- a stacking portion on which the sheet is stacked, the stacking portion including a lifting portion;
- a feeding member configured to feed the sheet stacked on the lifting portion toward the image forming portion;
- a motor configured to perform a lifting operation to lift the lifting portion so that the sheet stacked on the lifting portion is moved toward a feedable position in which the feeding member can feed the sheet stacked on the lifting portion;
- a position detecting sensor configured to detect that the sheet is in the feedable position;
- a rotator configured to be rotated by the motor;
- a rotation detector configured to detect rotation of the rotator; and
- a controller configured to determine a factor in which the position detecting sensor does not detect the sheet in the feedable position within a predetermined time, based on a detection result of the rotation detector during the lifting operation.

2. An image forming apparatus according to claim 1, further comprising a regulating portion being movable relative to the lifting portion, the regulating portion being configured to contact a trailing end of the sheet stacked on the lifting portion in a conveyance direction, and being configured to regulate so as to align the trailing end of the sheet,
- wherein the controller determines that the factor is a defective setting in which the regulating portion is not set to a position according to a size of the sheet stacked on the lifting portion in a case in which the rotation detector detects the rotation of the rotator.

3. An image forming apparatus according to claim 2, further comprising a display portion configured to display information,
- wherein the controller provides notification of the defective setting of the regulating portion by displaying on the display portion.

4. An image forming apparatus according to claim 3, further comprising a mount detector configured to detect whether the stacking portion is mounted on the image forming apparatus,
- wherein the controller determines that the factor is a malfunction of the position detecting sensor in a case in which (1) the position detecting sensor does not detect the sheet in the feedable position within the predetermined time based on a detection result of the rotation detector during the lifting operation and (2) the rotation detector detects the rotation of the rotator after detecting a mount/dismount operation of the stacking portion based on a detection result of the mount detector.

5. An image forming apparatus according to claim 4, wherein the controller provides notification of the malfunction of the position detecting sensor by displaying on the display portion.

6. An image forming apparatus according to claim 1, further comprising a transmission mechanism including (1) a gear being rotated with the rotator by the motor and (2) a torque limiter configured to shut off the transmission of the drive of the motor to the gear when a load of a predetermined amount or more is applied,
- wherein the controller determines that the factor is a failure of the transmission mechanism in a case in which the rotation detector does not detect the rotation of the rotator.

7. An image forming apparatus according to claim 6, further comprising a display portion configured to display information,
- wherein the controller provides notification of the malfunction of the transmission mechanism by displaying on the display portion.

8. An image forming apparatus according to claim 7, further comprising a mount detector configured to detect whether the stacking portion is mounted on the image forming apparatus,
- wherein the controller determines that the factor is a malfunction of the stacking portion in a case in which the controller controls the motor to lift up the lifting portion when detecting that the stacking portion is dismounted from the image forming apparatus based on a detection result of the mount detector, and then the rotation detector detects the rotation of the rotator.

9. An image forming apparatus according to claim 8, wherein the controller provides notification of the malfunction of the stacking portion by displaying on the display portion.

10. An image forming apparatus provided with an image forming portion for forming an image onto a sheet, the image forming apparatus comprising:
- a stacking portion on which the sheet is stacked, the stacking portion including a lifting portion;
- a feeding member configured to feed the sheet stacked on the lifting portion toward the image forming portion;
- a transmission mechanism including a motor and a gear configured to transmit a driving force of the motor to the lifting portion, wherein the motor is configured to perform a lifting operation to lift the lifting portion so that the sheet stacked on the lifting portion is moved toward a feedable position in which the feeding member can feed the sheet stacked on the lifting portion;
- a position detecting sensor configured to detect the sheet stacked in the feedable position;

a rotator configured to be rotated with the gear by the motor;

a rotation detector configured to detect rotation of the rotator; and a controller, wherein in a case where the position detecting sensor does not detect the sheet in the feedable position within a predetermined time during the lifting operation, the controller determines information to be displayed on a display panel based on a detection result of the rotation detector, and wherein the information is related to a factor in which the position detecting sensor does not detect the sheet in the feedable position within the predetermined time.

11. The image forming apparatus according to claim 10, wherein the information is related to any of (1) malfunction of the transmission mechanism, (2) malfunction of the stacking portion, and (3) malfunction of the position detecting sensor.

* * * * *